United States Patent [19]

Greschner et al.

[11] Patent Number: 5,213,600
[45] Date of Patent: May 25, 1993

[54] METHOD OF MANUFACTURING AN OPTICAL STORAGE DISK

[75] Inventors: Johann Greschner, Pliezhausen; Gerhard Schmid, Leinfelden-Echterdingen; Werner Steiner, Böblingen; Gerhard Trippel, Sindelfingen; Olaf Wolter, Schönaich, all of Fed. Rep. of Germany

[73] Assignee: International Business Machines Corp., Armonk, N.Y.

[21] Appl. No.: 445,866
[22] PCT Filed: May 27, 1989
[86] PCT No.: PCT/EP88/00479
§ 371 Date: Nov. 22, 1989
§ 102(e) Date: Nov. 22, 1989
[87] PCT Pub. No.: WO88/09990
PCT Pub. Date: Dec. 15, 1988

[30] Foreign Application Priority Data

Jun. 9, 1987 [DE] Fed. Rep. of Germany ....... 3719200

[51] Int. Cl.$^5$ .................. G11B 7/24; G11B 21/06; G11B 7/26
[52] U.S. Cl. .................. 65/102; 369/273; 427/164; 430/495
[58] Field of Search ............ 369/275.1, 109, 280, 369/287, 288, 283; 204/5, 6; 428/698, 694, 689; 430/945, 495; 427/10, 164, 162, 145; 65/102

[56] References Cited

U.S. PATENT DOCUMENTS

| 4,211,617 | 7/1980 | Hunyar | 204/6 |
| 4,457,794 | 7/1984 | Kotera | 427/10 |
| 4,643,740 | 2/1987 | Nicolson | 428/698 |
| 4,729,805 | 3/1988 | Alexander | 369/280 |
| 4,812,345 | 3/1989 | Imai et al. | 430/945 |

FOREIGN PATENT DOCUMENTS 0145344 6/1985 European Pat. Off. .
0168763 1/1986 European Pat. Off. .

OTHER PUBLICATIONS

Patent abstracts of Japan, vol. 11, No. 22 (P-538) (2469) Jan. 21, 1987.
Patent abstracts of Japan, vol. 7, No. 5 (M-184) (1150) Jan. 11, 1983.
Patent abstracts of Japan, vol. 11, No. 315 (C-451) (2762) Oct. 14, 1987.
Patent abstracts of Japan, vol. 10, No. 247 (P-490) (2303) Aug. 26, 1986.
Patent abstracts of Japan, vol. 7, No. 130 (P-202) (1275) Jun. 7, 1983.
Patent abstracts of Japan, vol. 11, No. 124 (C-416) (82) Apr. 17, 1987.

*Primary Examiner*—Stuart S. Levy
*Assistant Examiner*—Joseph A. Rhoa
*Attorney, Agent, or Firm*—Romualdas Strimaitis

[57] ABSTRACT

An optical storage disk includes a glass substrate (1) into which guide tracks (3) for servo-controlling the focussed light beams are directly stamped in by hot stamp process. After stamping, the glass substrate is thermally quenched in the stamping device to increase its breaking resistance through thermal curing. In order to achieve uniform guide tracks over the entire surface of an optical storage disk, flexible stamp stencils (35) in a flexible holder (34) are used whose curvature can be changed by applying hydro-static pressure. Suitable stamp stencils include monocrystalline silicon disks with surface hardening, or of metal disks, structured photolithographic processes. The stamp lands are made with bevelled edges to facilitate the separating of stamp and glass substrate after cooling.

4 Claims, 2 Drawing Sheets

METHOD OF MANUFACTURING AN OPTICAL STORAGE DISK

TECHNICAL FIELD

The invention relates to a method of a disc's manufacture, and to an apparatus for carrying out the manufacturing process.

BACKGROUND OF THE INVENTION

Optical storage disks are known as recording medium for video, audio, or digital information, and consist of a substrate with a coating into which optically scannable indicia in concentric or spiral-shaped tracks are generated. These indicia alter the optical characteristics (e.g. intensity or polarization) of a light beam of low intensity which is directed onto the rotating storage disk for reading out the stored information. For writing in the indicia, light beams of higher intensity can be used which alter an optical characteristic of the coating layer, or injection molding processes in those cases where the indicia represent small recesses, or so-called pits.

The advantage of optical storage disks lies in the high storage density that can be achieved, since optical scanning permits track widths and track spacings in the micrometer range.

Such small dimensions require a servo-control of the light beams focussed onto the information tracks, such servo-control being usually carried out with pre-grooved guide tracks on the optical storage disk. If, to give an example, the focus of the light beam is displaced during the rotation of the disk relative to the guide track, the intensity distribution in the reflected light beam will be altered, too, which is determined with suitably arranged photodetectors (e.g. 4-quadrant detectors) and converted into a corresponding closed-loop control signal.

In conventional optical storage disks the required relief of pre-formed guide tracks (or guide grooves) is generated in a synthetic layer which is either part of the synthetic substrate forming the entire optical storage disk (video or audio disks) or which has been deposited on a glass substrate, as suggested mainly for high quality optical storage disks for the storing of digital data. Onto the guide track relief an additional layer can then be applied which, e.g. for magneto-optical storage disks, represents the actual information storage layer.

The guide grooves are made preferably with stamps in the synthetic layer, e.g. a polymeric layer; owing to the small dimensions of the structures, the large surface to be processed with a perfect finish, and the high costs involved, photolithographic methods do not appear desirable for commercial use.

The characteristics of glass, its resistance to environmental influences and a low optical double refraction recommend it for substrates of high-quality optical storage disks. However, the hitherto used sandwich structure with a deposited synthetic layer in which the guide tracks are formed with the necessary precision would increase the costs for the manufacture of such disks. If eraseable storage disks are used whose information can be erased and modified by light beams of high intensity, e.g. in disks with a thermomagnetic storage layer, the repeated thermal load would cause decomposition of the synthetic layer and reduce the disk lifetime. Besides, the relatively low breaking resistance of glass represents a problem which calls for a complex chemical hardening process.

DISCLOSURE OF THE INVENTION

It is therefore the object of the present invention to provide a valuable optical storage disk of the type specified above, with a long lifetime and low manufacturing costs. The invention is also to provide a method of making such a disk, as well as an apparatus for carrying out the manufacturing process.

An apparatus for manufacturing glass substrates is known from JP-A-57 163536. This stamping device allows to curve the substrate to a convex shape while it is brought into contact with the opposite stamp. This may subject the substrate to undesirable stress.

The optical storage disk of the invention uses, as a substrate for the optical storage layer proper, a mere glass substrate in which the guide tracks are formed directly by a hot stamp process. The stamps used to manufacture such pre-formatted glass substrates are defined, e.g. photolithographically, in silicon or metal surfaces, preferably noble metal surfaces, which are subsequently coated to increase the holding time, e.g. a layer of diamond carbon. The vertical edges of the stamp lands for making the guide tracks are bevelled in the photolithographic process so as to facilitate the separation of the stamped glass blank and the stamp.

BRIEF DESCRIPTION OF THE DRAWINGS

Embodiments of the invention will now be described in detail with reference to drawings which show the following.

PREFERRED EMBODIMENT OF THE INVENTION

Figure 1:
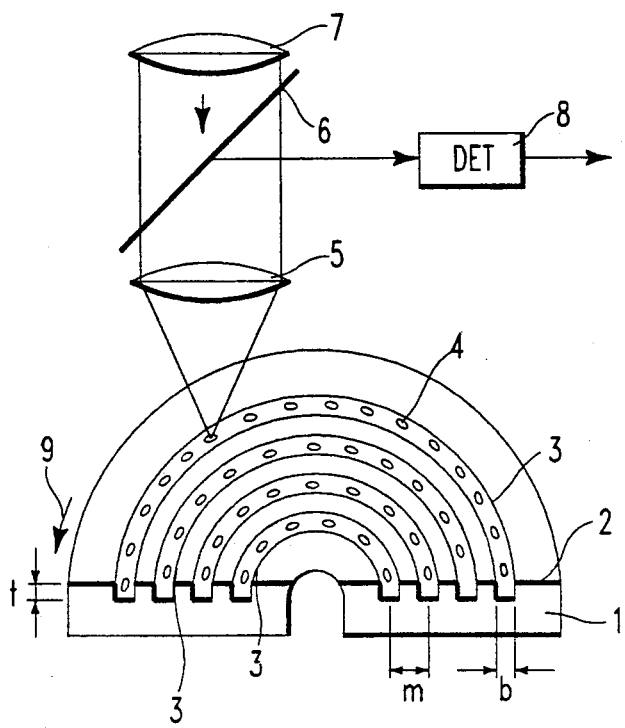
FIG. 1: A schematic representation of an optical storage system in a cross-section through a storage glass disk with grooved guide tracks shown in perspective view.

FIG. 1 depicts an optical storage system using an optical storage disk as recording medium which, consists of a glass substrate 1 whose guide tracks 3 are directly formed in the substrate by means of a hot stamp process; the guide tracks are provided concentrically to the disk center and have a width b of 0.6 $\mu$m and a mutual center spacing m of 2 $\mu$m. Depth t of the guide tracks is approximately 600 nm. After the stamping-in of the guide track structure, substrate 1 is coated with a layer 2 in which optical indicia 4 can be generated to represent the recorded information; such a representation can be a digital-binary data representation where the presence or absence of indicia is sensed, based on the length of indicia 4. Different optical layers 2 can be used for optical disk storages; e.g. magneto-optical layers where indicia 4, compared with their surroundings, have a reversed axial magnetization, or reflection layers where indicia 4 effect an intensity reduction of the reflected light. Indicia 4 can be provided in the guide tracks themselves, or on the lands therebetween.

The information stored on the optical disk is readout in that the disk being rotated in the direction of arrow 9 is scanned along the indicia tracks with a light beam 7 focussed by an optical system 5 on the surface of the information-carrying layer 2. The reflected light is deflected at a semi-transparent mirror 6 to a light detector 8 whose output signal is fed to respective evaluator circuits for data recognition and servo-control of the light spot position on the storage disk.

The transfer of the guide track structure onto the glass substrate, which may consist of a plane float glass with highly planar surfaces, is effected according to the invention with a stamp that forms the track grooves directly in substrate 1 which is heated above the softening point of the glass. Experiments have surprisingly shown that by selecting suitable materials and process parameters, and by following this apparently simple process the required fine structures can be transferred onto large glass substrates with high quality.

When selecting the material for the stamp the guide track structure must be transferable onto the stamp without complex process steps and with the necessary precision. The stamp should have a high holding time for the respective process temperatures. In particular, it should not scale or carbonize, and the stamp and heated glass blank should not stick together.

A suitable material that satisfies the two first-mentioned demands very well is a disk of mono-cristalline silicon into which, by means of conventional photolithographic processes, a relief in accordance with the reversed guide track structure is transferred. Sticking between the silicon stamp and the glass blank can be avoided by means of a hardening layer deposited on the stamp surface, such hardening layer differing considerably from the glass in its chemical aspects. The hardening layer may consist of diamond-like carbon which is deposited by known processes as a hard amorphous layer on the structured silicon surface. The characteristics and manufacturing processes of such layers are known, e.g. from the articles assembled in a recently published biography on this subject (Appl. Physics Comm., vol. 5, No. 4, Dec. 1985, pp. 263-283). These layers are preferably deposited in plasma. They can also be removed again in a plasma with oxygen filling, so that one and the same silicon stamp can be repeatedly cleaned of used layers, and re-hardened. Other hard surface layers can also be used, e.g. $Si_3N_4$, SiC, TiN, etc.

Noble metal coatings can also be used for the surface hardening of Si stamps, e.g. platinum; to increase the adhesion of a Pt layer to Si, a partial diffusion of Pt into Si can be achieved through a hot process known from the manufacture of integrated semiconductor circuits.

Apart from silicon as stamp material, it is also possible to use noble metals as e.g. Pt, Ru, Rh, Pd, as well as noble steel, Ni or Cu, if necessary with a surface hardening layer.

The thermal expansion coefficient of the stamp material should preferably correspond to that of the glass substrate since, as specified in detail below, the glass substrate is to be cooled after the forming process, while still in contact with the stamp. In order to prevent jamming of stamp and glass substrate during this cooling process, the invention furthermore suggests to provide a slight edge slope in the stamp instead of vertical edges, and to increase the height of the stamp structures compared with the depth of the guide structures on the glass substrate made thereby.

Figure 2:
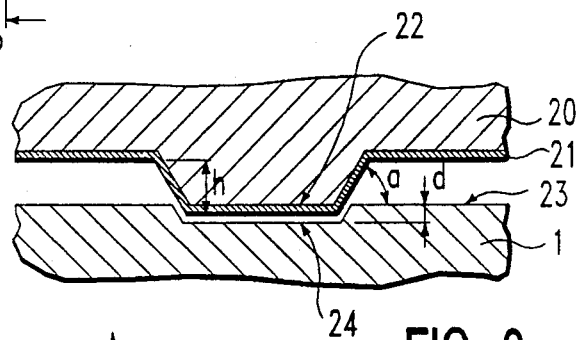
FIG. 2: an enlarged section of the surface of a stamp with bevelled edges for stamping the guide tracks into the glass substrate.

FIG. 2 shows a detail of the cross section through stamp 20 with a surface hardening layer 21 and with a stamp relief 22 for a guide track, whose depth d in substrate 1 only amounts to a fraction of height h of the stamp relief 22. The lateral edges of stamp relief 22 are inclined and form an angle $\alpha 50° < 90°$ which can be fixed at discretion within wide limits by suitable photolithographic etching steps.

Thus, stamp 20 touches substrate 1 during stamping only with the conical upper part of its stamp relief 22, insuring an easy separation between stamp and glass substrate after cooling.

The large ratio h/d guarantees even for large surfaces to be stamped that in regions 23 there is no contact between stamp 20 and substrate 1; if after stamping, substrate 1 is coated with the optical storage layer the original smooth surface of substrate 1 in land regions 23 is available for receiving the optical indicia.

If the thermal contact between stamp and substrate is to be improved, stamps can be used which, after stamping, contact the substrate with their entire surface.

In the proposed hot stamping process, the glass substrate has to be heated in excess of the softening point of the glass types used (typically higher than 600° C.). Prior to stamping, however, the stamp temperature should preferably be lower than the transformation temperature of the glass type used (typically 380°-450° C.); in that case, a thermal hardening of the glass substrate will be achieved by the cooling of the stamps, as specified below in detail. To avoid oxidation of the stamp and other tools, the process should be performed in inert gas or in a reducing atmosphere (e.g. forming gas).

Satisfactory results with respect to the precision of the stamp impression could also be reached with stamp temperatures that were only slightly lower than that of the heated glass substrate; in order to increase the stability of the glass substrate, a subsequent hardening step (chemically or thermally) is added.

Instead of forming grooves in the heated glass substrate by purely mechanical pressure, a high electrical voltage can be applied between the stamp (as a cathode) and the substrate (which may be contacted by a gold layer at its rear surface), either alone or in combination with mechanical pressure. This alternative is similar to the known anodic bonding process and uses voltages in the order of 1000 V and above; the temperature of the glass substrate may be as low as 300° C. which gives sufficient electrical conductivity.

The high electrostatic forces and possibly some ion transportation effects replicate (or help to replicate) the relief of the stamp in the glass substrate. Reversing the voltage can help to separate stamp and substrate without sticking.

Even if manufactured with high precision, plane glass substrates show large surface irregularities with a range of several micrometers, so that the present low stamping depths for the guide track structure and the large surfaces of optical storage disks will make it difficult to produce uniform guide tracks over the entire disk surface with stiff stamps. The invention therefore suggests, in one embodiment, to arrange thin stamp stencils on a flexible stamp support whose curvature can be altered by applying hydrostatic pressure. By suitably varying the pressure, the stamp can be brought into stepwise contact with the glass substrate, starting from the center or from the edges, and with a concave or convex shape of the stamp which, by pressure modifications, can gradually be approached to planar form.

Figure 3:
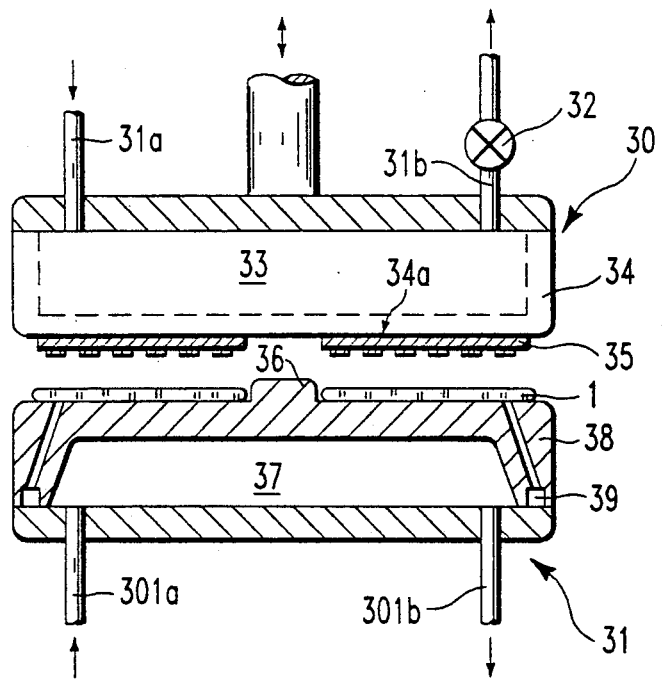
FIG. 3: a schematic representation of a cross-section through a stamp arrangement for stamping guide tracks into a glass substrate for an optical storage disk.

FIG. 3 shows a stamp arrangement for such flexible stamp stencils. A stamp part 30 movable in vertical direction can be shifted relative to a stationary stamp part 31 onto whose planar stamp support 38 the glass substrate 1 is placed in such a manner that its center opening engages in a centering pin 36 of stamp support 38. Stamp stencil 35, e.g. a thin flexible monocristalline silicon disk whose surface is provided with the complement of the guide track relief of glass substrate 1, is fixed at the lower side of upper stamp part 30 which consists e.g. of a molybdanum frame 34 whose relatively thin stamp plate 34a can adopt a concave or convex curve upon the application of a hydrostatic pressure in chamber 33. Molybdenum is selected for frame 34 owing to the similarity of its thermal expansion coefficient ($4 \times 10^{-6}$ $C^{-1}$) relative to silicon ($3 \times 10^{-6}$ $C^{-1}$). For altering the hydrostatic pressure in chamber 33, the inflow and outflow of temperature-resistant liquids through lines 31a, 31b can be altered by means of a valve 32. To protect molybdenum against oxidation it can be provided with a Si coating.

Stencil 35 can be fixed to stamp plate 34a, e.g. by hard soldering.

Stationary stamp part 31 also contains a chamber 37 for a liquid entering or existing via lines 301a, 301b. For removing the glass substrate 1 after the stamping process, one or both stamp parts 30, 31 can comprise air channels 39 for compressed air application.

In both stamp parts 30, 31 heating devices for the substrate or the stamp stencil, respectively, can also be included which permit to maintain various temperatures.

The arrangement in accordance with FIG. 3 can be operated in such a manner that, in one process step, the guide track structure is stamped into substrate 1 and the substrate is thermally hardened through a sudden inhomogeneous cooling step in order to increase the breaking resistance of the optical storage disk. For that purpose, chambers 33 and 37 are supplied with a coolant, e.g. water, after the stamping of substrate 1 with the upper stamp part 30, to achieve rapid cooling of the surfaces of substrate 1, and to cool the entire substrate 1 with a parabolic temperature curve (cool surfaces and warmer interior) below the transformation temperature of the glass, thus converting the temperature profile into a tension profile which gives the glass a high mechanical stability.

Figure 4A:
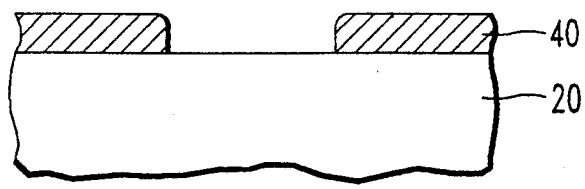
FIGS. 4A–D: an example of etching steps in making a silicone stamp with bevelled edges using a photoresist with vertical profile.
Figure 4B:
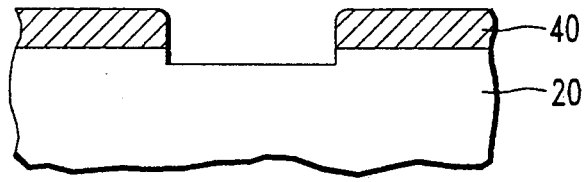
Figure 4C:
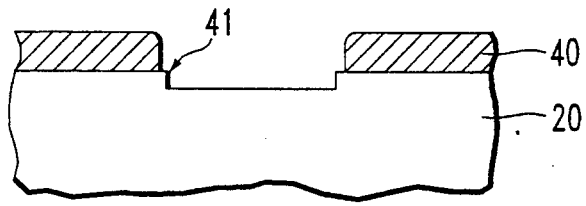
Figure 4D:
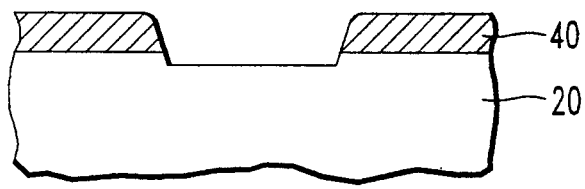

The production of stamps with edges deviating from the vertical is effected by photolithographic methods with a suitably selected etching ratio between photoresist and substrate. FIGS. 4A to 4D represent some steps of such an etching process, using a photoresist 40 with "vertical" edges. Through reactive anisotropic ion etching with a $CF_4$-pressure of approximately 13 $Nt/m^2$ (10 mTorr) and corresponding high frequency power, the structure of FIG. 4A is transferred into the silicon substrate, with the stamp structure being etched only partly in a first step (FIG. 4B). The anisotropic etching process is then replaced by an isotropic etching process (at approximately 1.3 $Nt/m^2$ (100 mTorr) and pressure and $O_2$ as the gas) to uniformly etch the photoresist mask alone (FIG. 4C). This process can easily be controlled up to a precision of $\pm 0.1$ $\mu m$. The original edges 41 of the stamp pit are thus exposed and bevelled in a subsequent anisotropic etching process at 10 m Torr and $CF_4$ as gas (FIG. 4D). Depending on the desired etch depth of the stamp structure, this change between anisotropic and isotropic etching has to be performed once or several times for achieving the desired profile.

Figure 5A:
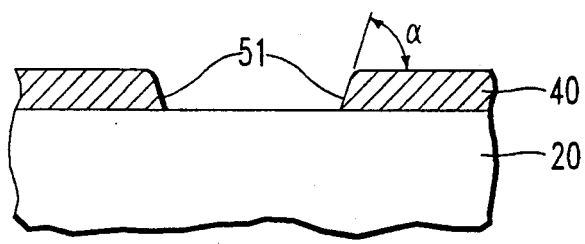
FIGS. 5A, B: an example of etching steps in making a silicone stamp with bevelled edges using a photoresist with "shallow" profile.
Figure 5B:
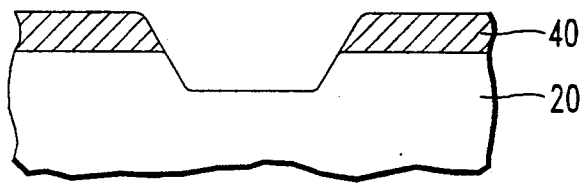

If photoresists with "shallow" edges ($\alpha < 70°$) are used, stamp edges 51 with the same angle can be made by means of a reactive ion etching step at low pressure (approximately 1.3 $Nt/m^2$ (10 mTorr) and an etching rate ratio between mask and substrate of approximately 1:1 (FIGS. 5A, 5B). The gas used is e.g. $CF_4$.

EXAMPLES

Glass substrates with a useful guide track structure can e.g. be made with the following process parameters:

| Glass Type | Glass Temperature °C. | Stamp Material | Stamp Temperature | Stamp Pressure kg/cm$^2$ |
| --- | --- | --- | --- | --- |
| 1 Soda-Lime-Glass | 670 | Si | 500 | 80 |
| 2 Soda-Lime-Glass | 670 | Si | 570 | 80 |
| 3 Soda-Lime-Glass | 680 | Si | 600 | 80 |
| 4 Soda-Lime-Glass | 640 | Si | 500 | 110 |
| 5 Soda-Lime-Glass | 675 | Pt on Si | 645 | 80 |

These tests show that higher stamp temperatures cause sharper structures, i.e. with sharper edges and lands with improved planeness.

While a preferred embodiment of the invention has been described herein, it should be apparent from the foregoing that many changes can be made within the spirit and scope of the invention. Accordingly the invention should be construed by the claims attached hereto rather than by the specific example described herein.

We claim:

1. Method of manufacturing a break resistant glass substrate for an optical disk comprising the steps:
    heating a plane glass substrate above its softening point, said substrate having exterior surfaces and interior volume;
    stamping a guide track relief into the softening glass substrate with a stamp whose temperature is lower than the temperature of the glass substrate; and
    suddenly cooling the stamp and the glass substrate by quenching the exterior surfaces of the heated glass substrate and cooling the interior volume of the glass substrate at an inhomogeneous rate below glass transformation temperature, a substantially parabolic temperature profile being maintained through the glass substrate, and the glass substrate being kept in contact with the cooled stamp, said cooling being achieved by the stamp having a chamber for a liquid entering said exiting the stamp.

2. Method of manufacturing a break resistant glass substrate for an optical storage disk comprising the steps:
    heating a plane glass substrate above its softening point, said substrate having exterior surfaces and interior volume;

stamping a guide track relief into the softened glass substrate with a stamp whose temperature is lower than the temperature of the glass substrate;

applying a high voltage between the heated glass substrate and the stamp, the substrate acting as the cathode; and cooling the stamp for quenching the exterior surfaces of the heated glass substrate and cooling the glass substrate below glass transformation temperature, a substantially parabolic temperature profile being maintained through the glass substrate, and the glass substrate being kept in contact with the cooled stamp.

3. Method of manufacturing a break resistant glass substrate for an optical storage disk comprising the steps:

heating a plane glass substrate above its softening point, said substrate having exterior surfaces and interior volume;

stamping a guide track relief into the softened glass substrate with a stamp having a stamp temperature which is lower than glass transformation temperature; and cooling the stamp for quenching the exterior surfaces of the heated glass substrate and cooling the glass substrate below glass transformation temperature, a substantially parabolic temperature profile being maintained through the glass substrate, and the glass substrate being kept in contact with the cooled stamping device, said cooling being achieved by the stamp having a chamber for a liquid entering and exiting the stamp.

4. Method of manufacturing a break resistant glass substrate for an optical storage disk comprising the steps:

heating a plane glass substrate above its softening point, said substrate having exterior surfaces and interior volume;

stamping a guide track relief into the softened glass substrate with a stamp whose temperature is lower than glass transformation temperature;

applying a high voltage between the heated glass substrate and the stamp, the substrate acting as the cathode; and suddenly cooling the stamp for quenching the exterior surfaces of the heated glass substrate and cooling the glass substrate below glass transformation temperature, a substantially parabolic temperature profile being maintained through the glass substrate, and the glass substrate being kept in contact with the cooled stamp.

* * * * *